United States Patent

[11] 3,589,352

| [72] | Inventors | Osten Carlsson; Kjell Ake Sonnbrink, both of Nacka, Sweden |
|---|---|---|
| [21] | Appl. No. | 778,597 |
| [22] | Filed | Nov. 25, 1968 |
| [45] | Patented | June 29, 1971 |
| [73] | Assignee | Atlas Copco Aktiebolag Nacka, Sweden |
| [32] | Priority | Dec. 4, 1967 |
| [33] | | Sweden |
| [31] | | 16595/67 |

[54] STONE-WORKING TOOL
5 Claims, 3 Drawing Figs.

[52] U.S. Cl. .................................................. 125/6, 173/80, 175/213
[51] Int. Cl. ....................................................... B28d 1/22, B25d 11/00, E21c 7/00
[50] Field of Search ............................................ 125/6; 175/213; 173/80

[56] References Cited
UNITED STATES PATENTS

| 2,201,270 | 5/1940 | McIntyre | 175/213 X |
| 3,198,265 | 8/1965 | Voelkerding | 175/213 X |
| 3,162,255 | 12/1964 | McCarty | 175/213 |
| 3,144,912 | 8/1964 | Boehm | 175/213 |
| 934,096 | 9/1909 | Schum | 125/6 |

*Primary Examiner*—Harold D. Whitehead
*Attorney*—Eric Y. Munson

ABSTRACT: In a stone-working tool of the dressing hammer type there is supported a swivel member above the hammerhead sealingly and rotatably around the stem of the tool. The swivel member is connected to a source of vacuum. Suction passage means extend between the front face of the hammerhead and apertures in the stem within the swivel member whereby stone dust generated by the hammerhead during work is removed via said passage means and swivel member.

INVENTORS
Östen Carlsson &
Kjell Åke Sonnbrink
BY
Eric Y. Munson

STONE-WORKING TOOL

BACKGROUND OF INVENTION

This invention relates to stone-working tools and more particularly to a stone-working tool for use in combination with a percussive machine conventionally incorporating a housing with an impact motor and a rotary chuck and having rotating means in the housing for rotating the chuck.

During work with such tools great annoyance is experienced by the operator due to stone dust whirling around the working edges, obscuring visibility, and being potentially harmful to the worker. Enclosing the tool in a hood connected to vacuum is disadvantageous because then the working edges cannot be observed as work goes on. Blowing away of stone debris and cuttings for example by exhaust air when the percussive machine is driven pneumatically causes whirling up of still more suspended particles into the air, increasing their annoying and harmful effects on the surrounding. Use of outer suction hoses only results in incomplete removal. The type of percussive machines usually contemplated for the work in question has no axial through passages therein and this is why evacuation of stone dust through such passages and through a hollow tool has not been used in practical operation. Besides, evacuation of stone dust through the interior of a percussive machine, as such, causes a constructional complication with the inherent risk of stone dust penetrating into the guide cavities of the machine which are very sensitive to abrasive wear. Similarly, evacuation of stone dust via the interior of the tool to vacuum through a swivel member arranged around the shank of the tool, which has been suggested in the prior rock-drilling art, requires a constructional modification of the chuck end of the percussive machine and of the tool retainer thereof so that the machine becomes more expensive and less suitable for other standard operations.

BRIEF DESCRIPTION OF INVENTION

It is an object of the invention to incorporate in a stone-working tool of the stone-dressing hammer type to be combined with a percussive machine of the above-mentioned character, the principle of removal of stone dust by suction through the interior of the tool without in any way affecting the construction of the percussive machine. Further objects of the invention are to provide a stone-working tool of the above character that will be effective in use, convenient in handling, and will have increased standard in respect of working hygiene.

BRIEF DESCRIPTION OF DRAWINGS

The above and other objects of the invention will become obvious from the following description and from the accompanying drawings in which a preferred embodiment of the invention is illustrated by way of example. It should be understood that this embodiment is only illustrative of the invention and that various modifications thereof may be made within the scope of the claims.

DESCRIPTION OF PREFERRED EMBODIMENT

Figures 1, 2, 3:
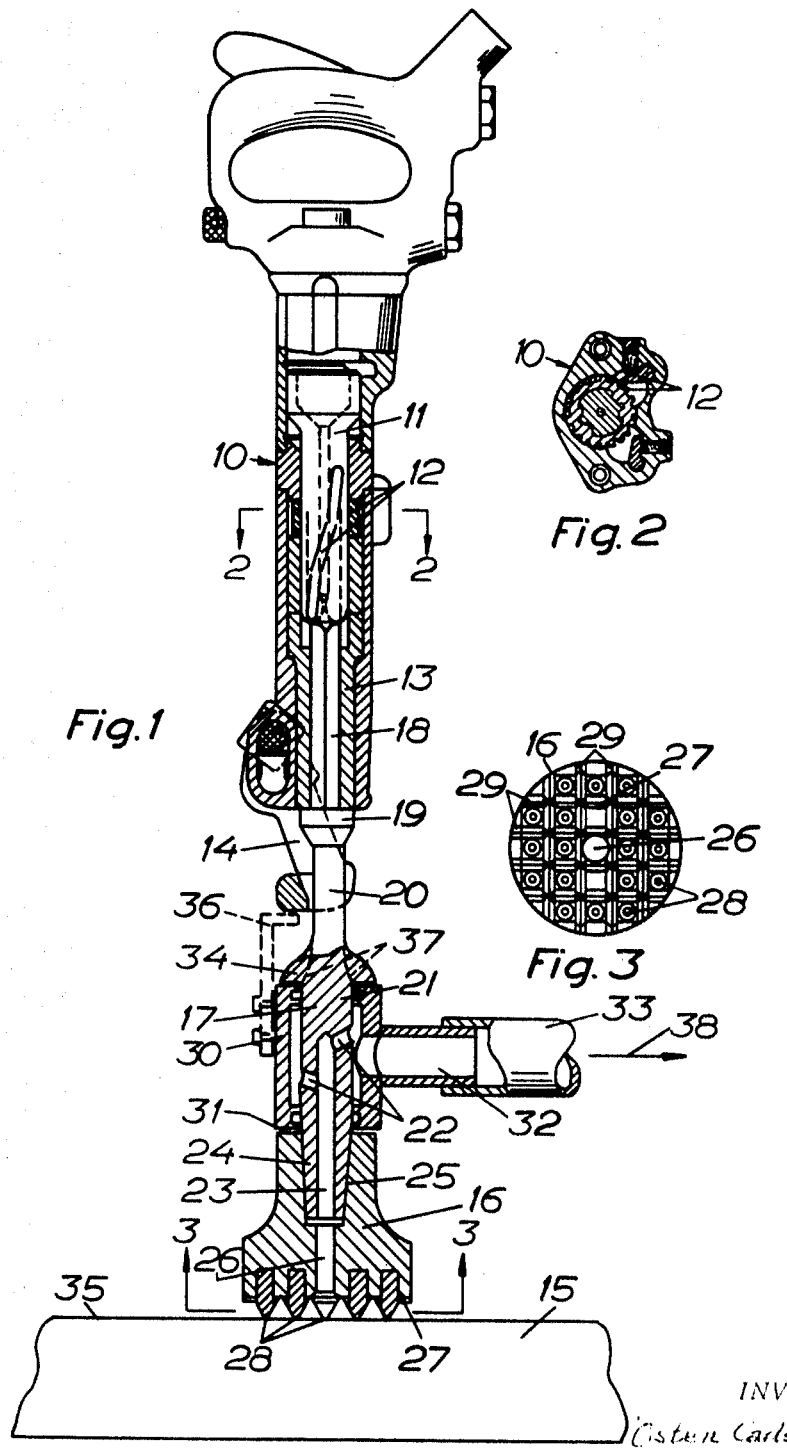
FIG. 1 in the drawings shows a longitudinal section through a percussive machine with a stone-working tool inserted therein and embodying the invention.
FIG. 2 shows a section through the machine on the line 2-2 in FIG. 1.
FIG. 3 is an end view of the tool seen on the line 3-3 in FIG. 1.

A conventional percussive machine with a housing 10 may be driven by compressed air or in other suitable way and has an impact motor therein. The impact motor of the compressed air driven machine that has been chosen as an example comprises a reciprocable hammer piston 11 driving in a manner well known in the art a rotation mechanism 12 whereby a chuck 13 journaled in the housing 10 is rotated intermittently during one of the strokes of hammer piston 11. The housing 10 carries pivotally at the forward end thereof a conventional tool retainer 14 which can be pivoted away for release. By aid of the percussive machine with the housing 10 thereof supported by a linkage stand, not shown, including parallel links for guiding the vertical movements of the machine, a stone block 15 roughly prepared as by sawing, is worked upon and dressed flat on a working surface 35 by a stone-working tool inserted into the chuck 13.

The stone-working tool comprises a dressing hammerhead 16 and a stem portion 17 extending therefrom which stem portion rearwardly thereof is completed by a shank 18 against which the hammer piston 11 of the machine 10 delivers blows. The shank 18 has suitable polygonal cross section and is nonrotatably inserted in a corresponding recess in the chuck 13 for rotation in unison therewith. Forwardly of the shank 18 the stem portion 17 has a collar 19 formed thereon, in front of which collar a reduced portion 20 of the stem portion has circular cross section and can be encircled by the tool retainer 14 in front of the collar 19 whereby the stem portion 17 is retained on the machine 10. The stem portion 17 has a forward cylindrical portion 21 provided with radial apertures 22 connected to a central forwardly directed complementary suction passage 23 formed by a bottom hole. The tip 24 of the stem portion 17 is conical separably matching and cooperating with a conical socket 25 in the rear end of the hammerhead 16 whereby a separable connection suitable for transmitting impacts is created between the shaft portion 17 and the hammerhead 16.

The hammerhead 16 has suction passage means provided by a central through suction passage 26 which extends from the front end face 27 of the hammerhead 16 to the socket 25. Working edges 28 are formed by hard metal plugs which project in forward direction from the end face 27 with the working edges 28 disposed in substantially coplanar relation. Between the working edges 28 there is formed a crosslined right angular pattern of straight suction grooves 29 in the end face 27. The grooves 29 are in communication with the mouth of the suction passage 26 directing air thereto for the removal and transportation of drilling dust away from the front face 27. The working edges 28 are centered in the checks formed by the grooves 29 which are used as guides during resharpening of the working edges 28 by way of a grinding wheel following the grooves 29.

Sealingly around the cylindrical portion 21 of the stem portion 17 is disposed a swivel member 30 slid onto the stem portion 17 from the forward direction past the conical tip 24. Upon engagement of the conical tip 24 with the socket 25 the swivel member 30 will bear against a shoulder 31 around the socket 25 at the rear end of the hammerhead 16. The swivel member 30 is provided with a laterally directed nipple 32 and the interior thereof communicates via said nipple and a suitable hose connection 33 with vacuum designated by the arrow 38 in a conventional separation and pump device for the separation and collection of stone dust, not shown.

For retaining the swivel member 30 axially immovably but rotatably rearwardly of the stone-dressing hammerhead 16, the stem portion 17 is provided with a central collar 34 providing abutment means with which the rear end face of the swivel member 30 cooperates.

In operation the hose connection 33 is connected to vacuum 38 and the machine 10 is started with the stone working tool inserted in the chuck 13 and rotated intermittently thereby. With the hammer piston 11 delivering impacts against the shank 18, the impact impulses are applied against the stone surface 35 via the shank 18, the stem portion 17, and the hammer head 16 by the working edges 28 thereof. Via the crosslined checkered pattern of grooves 29, the suction passage 26, the air passage 23, the apertures 22, and the swivel member 30, the stone dust created by the edges 28 is sucked away continuously so that work can be performed with undisturbed visibility and without inconvenience from the stone chips and dust. During the return stroke of the hammer piston 11 the tool is rotated by the chuck 13 and the rotation mechanism 12 thereof in fully conventional manner.

If desired the central collar 34 may be omitted by providing the swivel member 30 with a rearwardly pointing axial stop 36, depicted by broken lines in FIG. 1, and providing abutment means which cooperates with the forward end of the tool retainer 14. This prevents upward movement of the swivel member 30 away from the shoulder 31. In this modification the stem 17 is made with a suitable transition designated by broken lines and numeral 37 in FIG. 1 between the reduced cylindrical portion 20 and the cylindrical portion 21.

What we claim is:

1. A stone-working tool for dressing stone surfaces, said tool for use with a percussive machine having a housing containing an impact motor driving a rotary chuck, and rotating means rotating said chuck, said tool comprising: a stone-dressing hammerhead having a plurality of substantially coplanar working edges on a leading face thereof, and a socket in said head extending from a rear face of said head to a midportion of the interior of said head, and an air passage extending from the leading face of said hammer to said socket; a stem having a hollow end fitting into the socket in said head and dimensioned to leave the rear face of said head free as a shoulder, the hollow end of said stem communicating with the air passage in said head and leading to radial apertures in said stem; a solid stem portion; a shank extending from said solid stem portion insertable into said chuck; a swivel member rotatably mounted on said stem slidably bearing on the free rear face of said hammer, said swivel having an air passage in communication with the radial apertures in said stem; and means coupling the air passage in said swivel to a vacuum source.

2. A stone-working tool for use in combination with a percussive machine incorporating a housing, an impact motor and a rotary chuck in said housing, and rotating means in said housing for rotating said chuck, said tool comprising a stone-dressing hammerhead provided with a front end face and a plurality of substantially coplanar working edges thereon, a conical socket in said hammerhead opposed to said end face thereof, a shoulder on said hammerhead around said socket, a stem portion, a conical tip on said stem portion matching said socket for providing, when inserted therein, a separable connection between said hammerhead and said stem portion, a shank at the end of said stem portion remote from said hammerhead and insertable into said chuck for rotating said tool and for transmitting impacts from said impact motor to said working edges, suction passage means in said hammerhead extending between said end face and said socket thereof, aperture means on said stem portion, a complementary suction passage in said stem connected to said aperture means and extending axially through said tip, a swivel member rotatably supported on said shoulder sealingly around said stem portion and said aperture means thereof, and means connecting said swivel member to a source of vacuum for removing stone dust generated by said working edges internally through said tool and said suction passage means thereof.

3. A stone-working tool according to claim 2 in which there is provided a collar intermediately on said stem portion for retaining said swivel member axially therebetween and between said shoulder when said tip is inserted in said socket.

4. A stone-working tool according to claim 1 in which said suction passage means is a single passage having its mouth at the front end face coaxial with said hammerhead, a crosslined pattern of straight suction grooves on said front end face and communicating with said mouth, and said working edges being centered in the checks of said pattern of grooves.

5. A stone-working tool for use in combination with a percussive machine incorporating a housing, an impact motor and a rotary chuck in said housing, and rotating means in said housing for rotating said chuck, said tool comprising a stone-dressing hammerhead provided with a front end face and a plurality of substantially coplanar working edges thereon, a shoulder on said hammerhead opposed to said end face, a stem portion extending rearwardly from said hammerhead beyond said shoulder thereof, a shank at the end of said stem portion remote from said hammerhead and insertable into said chuck for rotating said tool and for transmitting impacts from said impact motor to said working edges, suction passage means in said tool extending to said end face of said hammerhead, aperture means on said stem portion rearwardly of said shoulder and connected to said suction passage means, a swivel member rotatably supported sealingly around said stem portion and said aperture means thereof, said swivel member resting with one end thereof against said shoulder, abutment means at the other end of said swivel member for retaining said swivel member axially fixedly but rotatably on said stem portion, and means connecting said swivel member to a source of vacuum for removing stone dust generated by said working edges internally through said hammerhead and said suction passage means thereof.